April 15, 1930.  J. L. MURPHY  1,755,016
HAY AND GRAIN HANDLING MACHINE
Filed Sept. 12, 1929  3 Sheets-Sheet 1
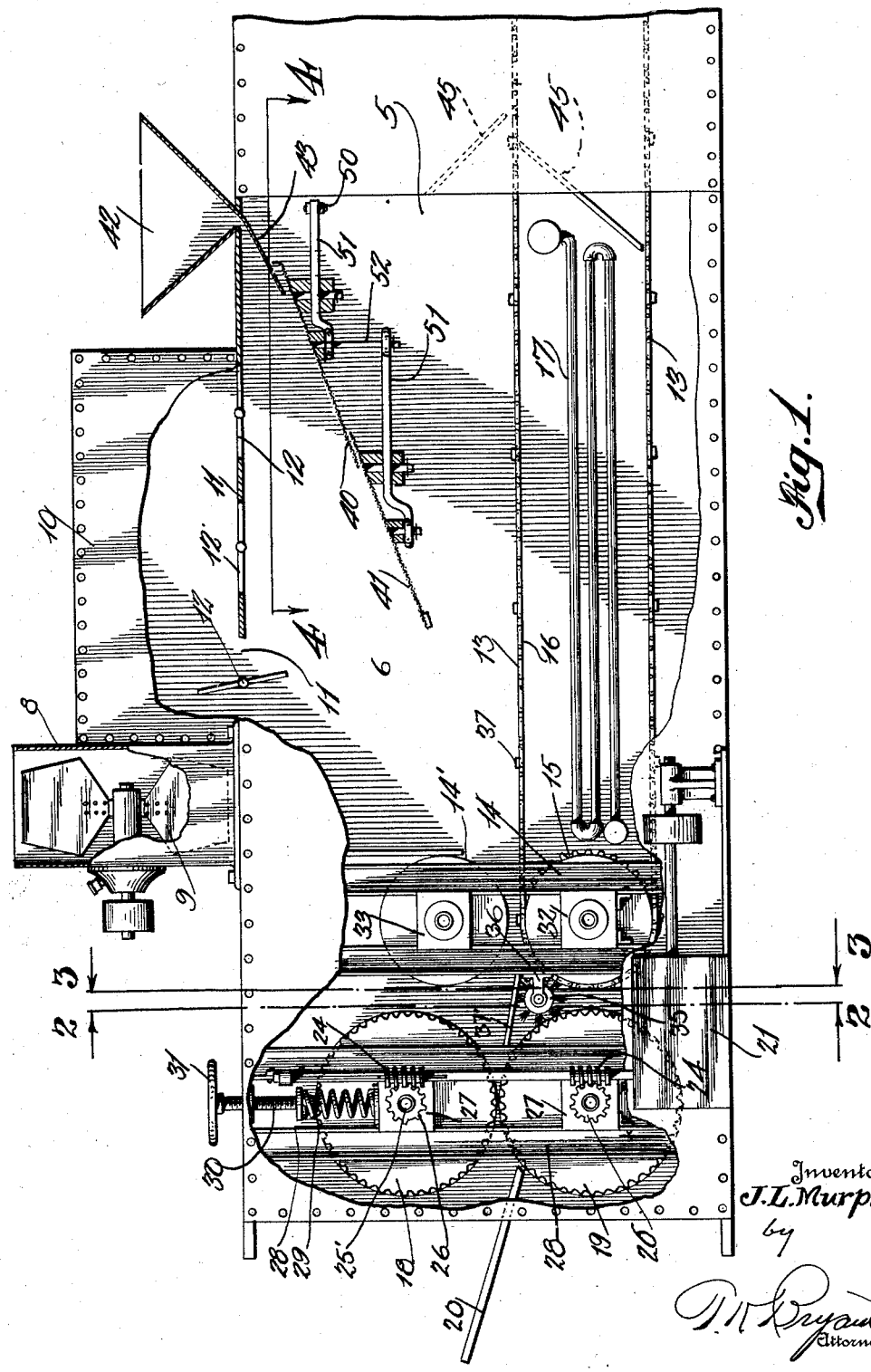

April 15, 1930.　　　　J. L. MURPHY　　　　1,755,016
HAY AND GRAIN HANDLING MACHINE
Filed Sept. 12, 1929　　　3 Sheets-Sheet 2
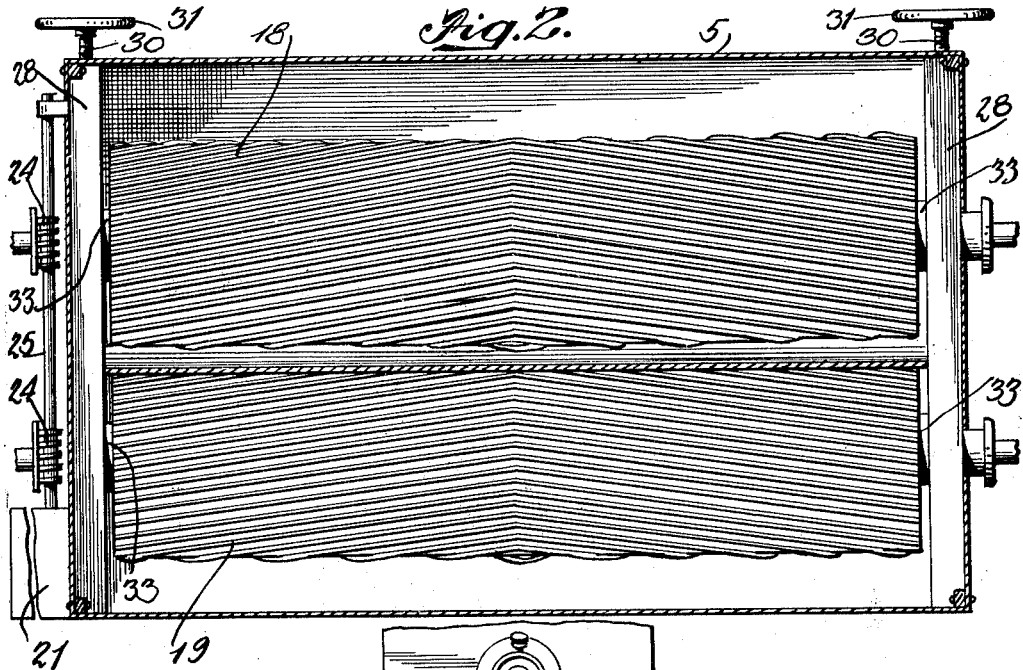
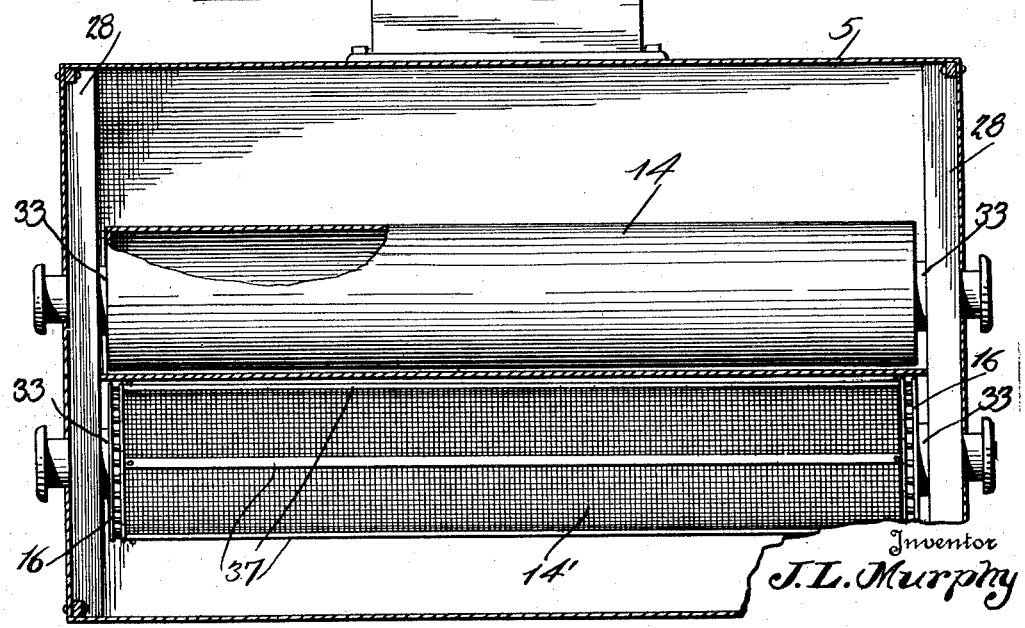
Inventor
J. L. Murphy
By
Attorney April 15, 1930.  J. L. MURPHY  1,755,016
HAY AND GRAIN HANDLING MACHINE
Filed Sept. 12, 1929  3 Sheets-Sheet 3

Inventor
J. L. Murphy.
by
M. Bryant
Attorney

Patented Apr. 15, 1930

1,755,016

UNITED STATES PATENT OFFICE

JOHN LINLEY MURPHY, OF ITHACA, NEW YORK

HAY AND GRAIN HANDLING MACHINE

Application filed September 12, 1929. Serial No. 392,122.

This invention has relation to apparatus for drying hay or grain, and especially for drying hay, and consists in the novel construction, combination and arrangement of parts and devices in an apparatus wherein the material to be dried is fed by means of heated feeding rollers into a chamber or compartment wherein the material is subjected to a sweating process and is then carried through a series of chambers, wherein the air is caused to circulate over and through the material by means of suction fans, means being provided for regulating the heat, air currents, etc., as will be hereinafter more fully described.

In the accompanying drawings illustrating a preferred embodiment of my invention, Figure 1 is a side elevation, of the apparatus partly in section, disclosing interior arrangement;

Figure 2 is a vertical transverse section on the line 3—3 of Figure 1;

Figure 3 is a similar section on the line 2—2 of Figure 1;

Figure 4:
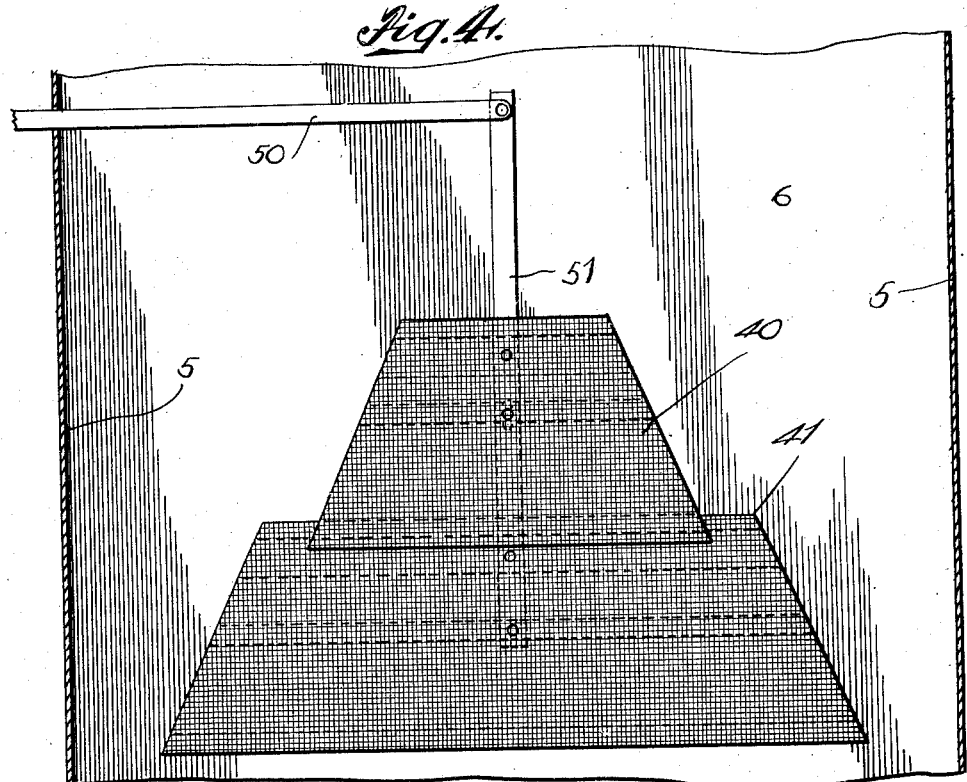
Figure 4 is a horizontal section on the line 4—4 of Figure 1.
Figure 5:
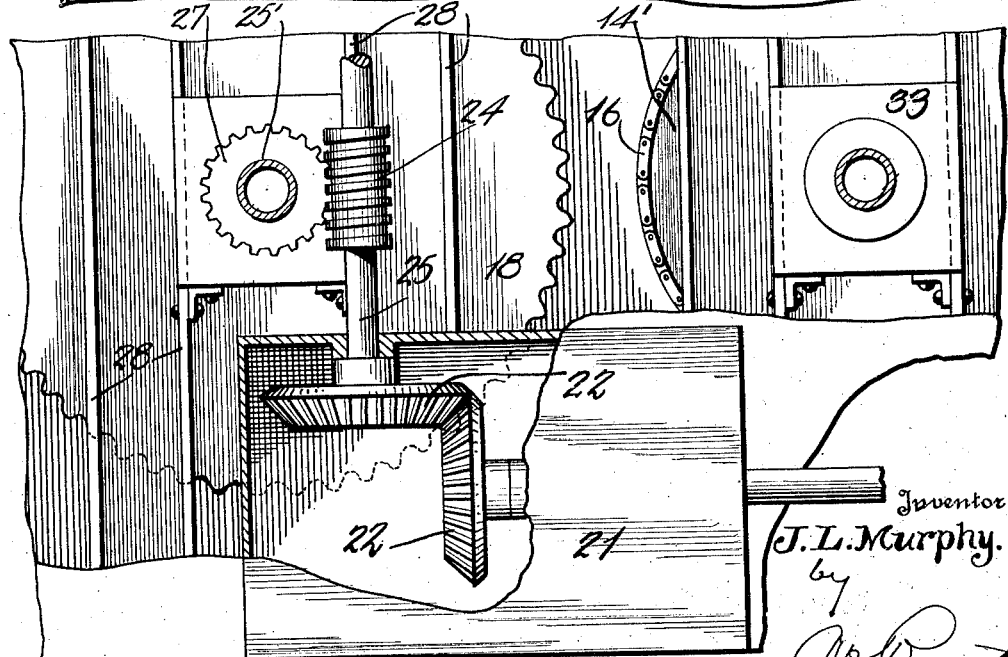
Figure 5 is a detached sectional view and elevation of details hereinafter described.

The framing of the apparatus comprises an elongated box or tunnel of desired dimensions designated, generally by the numeral 5, and consisting of side, top and bottom plates bolted together.

There is a central chamber 6 formed in this box and separated from the forward and rear compartments by suitable vertical partitions.

Upon the top of the box 5 is located a housing 8, in which is mounted a power driven suction fan 9. This housing communicates with a walled chamber or hood 10 and below this chamber or hood, the roof or upper wall of the casing 5 is provided with openings 11, 11, equipped with dampers or valves 12, 12.

In the lower part of the structure there is arranged an endless carrier 13, which passes around a pair of horizontal rollers, represented by the first roller 14, the shaft of which carries a chain wheel 15 with which a driving chain or chains 16 engage.

The numeral 17 designates a coiled steam pipe connected with a steam supply and intended and adapted to heat the interior of the apparatus.

This heater may be located in any convenient position. Near the forward end of the apparatus there is arranged a pair of metallic hollow steam heated rollers 18, 19 which are intended to operate as feed rollers, and which are formed with herring bone ridges to obtain purchase on the hay which is fed between them from a chute 20. These rollers are operable in opposite directions and are driven from a suitable motor 21 through the gearing 22, worms 24, vertical shafts 25 and suitable incidental connections including the journals 25' of the rollers, and the worm wheels 26 keyed thereto. These journals are tubular to admit steam to the interior of the rollers. The journals are mounted in blocks 27, which are movable vertically in guides 28 to adjust the rollers to different distances apart, and pressure springs 29 for the upper roller are located above the blocks 27 and adapted to be compressed or relieved by means of screws 30, and hand wheels 31.

Back of the rollers 18 and 19 are located the interiorly heated rollers 14, 14' arranged one above the other, with their shafts or journals rotatable in bearing blocks 32—33. These rollers may be also relatively adjustable by having the bearing blocks fitted between vertical guides.

The pair of rollers 14—14' may be partitioned apart from the rollers 18, 19 to form a substantially closed intervening compartment constituting what may be termed a sweat box, wherein the hay delivered by the rollers 18—19 to the rollers 14—14' may be subjected to a partial cooking or sweating process due to the heat from the several rollers. Openings are to be provided in the partitions for the passage of the hay.

Between the roller 19 and the roller 14', a suitable operated circular rotary brush 35 is journaled in brackets 36, for the purpose of keeping the endless conveyor clean and assisting in the conveyance of the hay to the carrier.

The latter is provided with transverse slots or cleats 37. Above the brush 35 is arranged an inclined chute 37' to further aid in delivering the hay to the conveyer, and drying chamber.

The hay when delivered to the second or vacuum chamber is carried along upon the conveyor and subjected to the currents of air heated in the vacuum chamber and drawn off by means of the fan. The conveyer is to be constructed of suitable openwork fabric or meshing to allow the air currents to flow therethrough.

As before described the roof or top of the box 5 is formed with openings below the hood 10 and with corresponding dampers or valves by the adjustment of which the course and force of the air currents produced by the fan suction may be regulated.

A similar provision may be made for other compartments through which the hay may be conveyed and by which the course of the incoming air may be changed as it is necessary at times to be able to change the condition of the material treated when finished.

The hood in such cases is used for ventilating purposes to draw the cool air up through the material after leaving the drying compartment.

To adapt the apparatus to the treatment of grain or the like I provide the second or vacuum chamber with a series of vibratory distributor screens 40—41', and with a hopper 42, and chute 43. The material is fed to the screens from the hopper by way of the chute and is allowed to flow down over the screens to and upon the endless conveyor or apron, and carried through the apparatus at the speed necessary for drying purposes. The shape and operation of the screen allows the necessary air from fans to circulate the same through the material and effect complete drying.

To control the admission of air to the vacuum chamber, the latter is provided with suitable openings in its rear end wall, having swinging doors 45.

The vibratory screens 40, 41 may be operated by any suitable and known means, and to the drawings 50 designates a power conveying connection operated from an eccentric 51 represents vibratory or shaking levers 52, a link pin connecting the screen.

I claim:—

1. An apparatus of the character described, comprising a drying chamber, means for heating the air therein, a suction fan communicating with said chamber, valved communications between the drying chamber and the fan housing, an endless conveyer in said drying chamber, rollers upon which said conveyer is mounted, one of which is adapted to be heated, a heatable roller above the latter, a pair of relatively adjustable feed rollers located in advance of the first mentioned rollers and adapted to be heated, and a substantially closed chamber between the two sets of rollers for the purpose of sweating the hay in its transfer to the drying chamber.

2. An apparatus of the character described, comprising a drying chamber, means for heating and ventilating the same, means for conveying material through said chamber, a pair of relatively adjustable heatable rollers located in advance of the chamber, a second pair of internally heated rollers in advance of the first rollers, and a closed sweating chamber between the two pairs of rollers.

In testimony whereof I affix my signature.

JOHN LINLEY MURPHY.